United States Patent [19]

Inoue

[11] Patent Number: 5,673,998

[45] Date of Patent: Oct. 7, 1997

[54] DISCHARGE LAMP AND LIGHTING APPARATUS AND LIQUID CRYSTAL DISPLAY APPARATUS USING THE CHARGE LAMP

[75] Inventor: Naoto Inoue, Shiki-gun, Japan

[73] Assignee: Sharp Kabushiki Kaisha, Osaka, Japan

[21] Appl. No.: 440,714

[22] Filed: May 15, 1995

[30] Foreign Application Priority Data

Jun. 7, 1994 [JP] Japan ................................. 6-125341

[51] Int. Cl.⁶ ........................................... H01J 17/00
[52] U.S. Cl. ........................ 362/260; 313/493; 313/634; 313/636
[58] Field of Search ........................ 362/260; 313/493, 313/634, 636

[56] References Cited

U.S. PATENT DOCUMENTS

| 4,255,687 | 3/1981 | Van Engelen et al. | 313/493 |
| 5,008,789 | 4/1991 | Arai et al. | 362/260 |
| 5,059,860 | 10/1991 | Sato et al. | 313/493 |

FOREIGN PATENT DOCUMENTS

| 2-63092 | 3/1990 | Japan . |
| 4-97316 | 3/1994 | Japan . |

OTHER PUBLICATIONS

"Technical Trends of Active Matrix LCDs" s. Kaneko et al. Journal of the Illuminating Engineering Institute of Japan vol. 78, No. 12, 1994, pp. 635–638.

Primary Examiner—Ira S. Lazarus
Assistant Examiner—Sara Sachcie Raab

[57] ABSTRACT

In a lamp main body in a discharge lamp provided in a lighting apparatus of an edge-lighting type which is used as a back-lighting section of a liquid crystal display apparatus, refractive indexes are distributed such that a light emitted from an inner space traveling in the lamp main body can be guided to a specific direction. In other words, the lamp main body is divided into a plurality of portions and the portions are formed such that refractive indexes become gradually smaller from a light converging side towards a back surface side which is opposite to the light converging side. With this arrangement, a discharge lamp, which is capable of emitting a light from a surface of the lamp main body to a specific direction, can be obtained. Moreover, when the discharge lamp is used, efficiency of utilization of a light is improved, thereby making it possible to obtain a lighting apparatus with high surface brightness and low power consumption. As a result, a liquid crystal display apparatus with high brightness and low power consumption can be obtained.

12 Claims, 9 Drawing Sheets

DISCHARGE LAMP AND LIGHTING APPARATUS AND LIQUID CRYSTAL DISPLAY APPARATUS USING THE CHARGE LAMP

FIELD OF THE INVENTION

The present invention relates to a discharge lamp in which refractive indexes are distributed in its lamp main body, a lighting apparatus and a liquid crystal display apparatus using the discharge lamp.

BACKGROUND OF THE INVENTION

In those years, a liquid crystal display apparatus is widely used as a display of a portable office automation apparatus, etc. A liquid crystal display apparatus is provided with a liquid crystal panel and a back lighting section for irradiating a light the liquid crystal panel from its back surface. A lighting apparatus of an edge-lighting type shown in FIG. 14 has been a main lighting apparatus used in the back-lighting section because of its advantages of easy miniaturization and low power consumption. In the above lighting apparatus, a discharge lamp (cold cathode gas discharge tube, for example) 52 which is a linear light source is installed on an end of a light guiding plate 54 having light transmitting characteristics as a surface light source.

Figure 15:
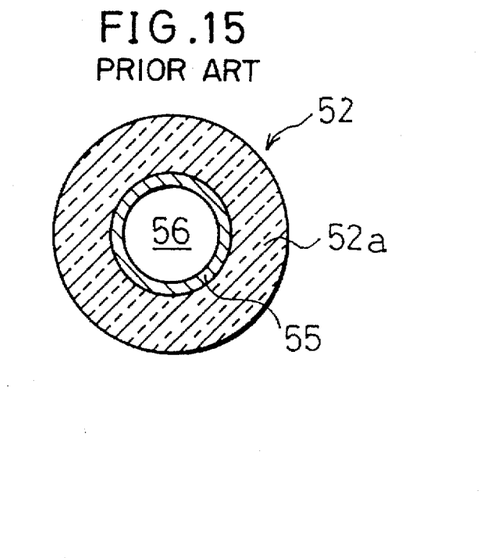
FIG. 15 is a cross section of a conventional discharge lamp.

As shown in FIG. 15, the conventional discharge lamp 52 installed in such a lighting apparatus have a cylindrical lamp main body 52a. A fluorescent material 55 is applied to an inner circumferential surface of the lamp main body 52a, and hydrargyrum, a small amount of argon, etc. are sealed in an inner space 56 of the lamp main body 52a with them having lower pressure than atmospheric pressure. Then, an ultraviolet light generated in the inner space 56 is converted into a visible light and scattered by the fluorescent material 55. The scattered light goes through the lamp main body 52a and is emitted from its outer circumferential surface.

In order to produce the discharge lamp 52 most efficiently, soda glass, etc. where refractive indexes are uniformly distributed in each section has been conventionally used as a material of the lamp main body 52a in the discharge lamp 52.

Figure 14:
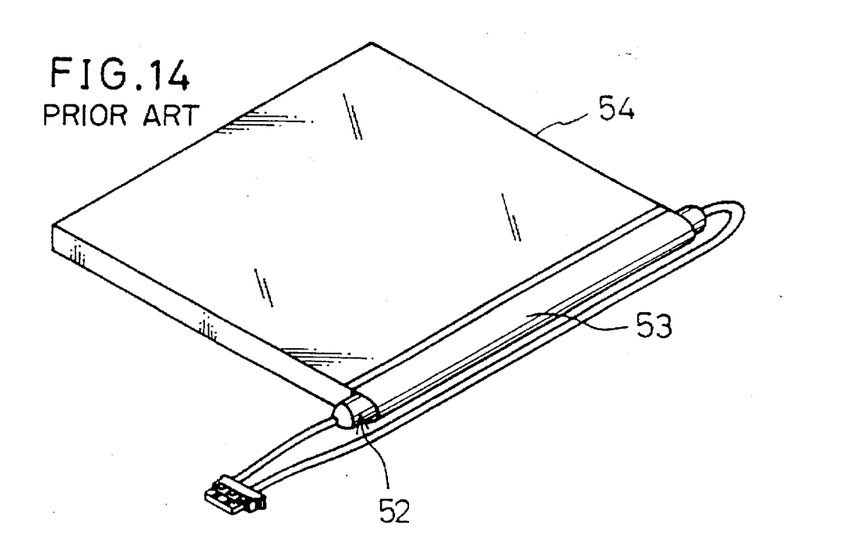
FIG. 14 is a perspective view which shows a conventional lighting apparatus of an edge-lighting type.

However, when the soda glass, etc. where refractive indexes are uniformly distributed in each section is used as the material of the lamp main body 52a, a light which has been emitted from a surface of the discharge lamp 52 is substantially uniformly distributed radially over a total length of the lamp main body 52a. In other words, the light emitted from a center of the lamp main body 52a radially. Therefore, as shown in FIG. 14, a reflecting member 53 is provided in the lighting apparatus of the edge-lighting type so as to cover a back surface of the discharge lamp 52. The reflecting member 53 guides a light emitted to directions other than a direction of the light guiding plate 54 in the discharge lamp 52 to the light guiding plate 54.

However, in the case where a light is guided to the light guiding plate 54 by means of the reflecting member 53, after a light to be emitted to a direction of the reflecting member 53 is reflected at least once or more between the reflecting member 53 and the surface of the lamp main body 52a, the light enters the light guiding plate 54, so light energy generated from the discharge lamp 52 is not sufficiently transmitted to the light guiding plate 54. Moreover, since a light, which is emitted to an opposite direction to the light guiding plate 54, viewing from the lamp main body 52a, is reflected many times, the light energy mostly changes to heat energy at the lamp main body 52a and the reflecting member 53, and it is not used as an irradiation light. As a result, brightness of a lighting apparatus is lowered, thereby arising a problem that a lighting unit in which brightness is high and power consumption is low cannot be obtained.

Therefore, in order to make a light to be emitted from a discharge lamp enter a light guiding plate efficiently so that efficiency of utilization of a light between a discharge lamp and a light guiding plate is improved, the following arts has been introduced.

Japanese Unexamined Patent Publication No. 4-97316/1992 (Tokukaihei 4-97316) discloses, for example, an arrangement that a shape of a lamp main body in a discharge lamp is a elliptical cross section and a light guiding material (floodlighting space) is provided in a major axial direction of the ellipse. With this arrangement, uniform distribution of refractive indexes is intentionally replaced with non-uniform distribution so as to change a direction of transmitting a light, and distribution of a light to be emitted from a surface of the discharge lamp is collected to the major axial direction. Therefore, efficiency of utilization of a light of the discharge lamp for the light guiding material is improved.

Figure 16:
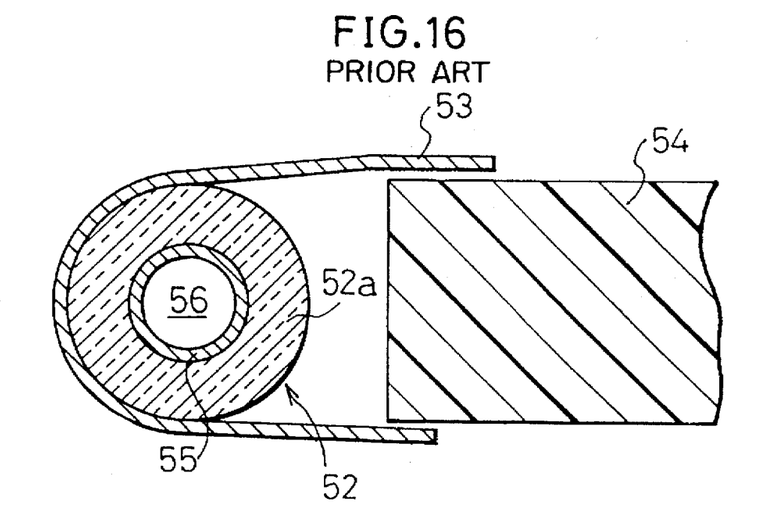
FIG. 16 is a cross section of a main section which shows a conventional lighting apparatus of an edge-lighting type.

In addition, as shown in FIG. 16, the Japanese Unexamined Patent Publication No. 2-63092/1990 (Tokukaihei 2-63092) discloses a lighting apparatus having an arrangement that the reflecting member 53 is stuck to a half area of an outer periphery of the lamp main body 52a in the discharge lamp 52. With this arrangement, a loss of a light, which is generated on a boundary between the outer periphery of the lamp main body 52a and an air layer due to a great difference in refractive indexes, can be prevented.

However, with the arrangement disclosed in the Japanese Unexamined Patent Publication No. 4-97316/1992 (Tokukaihei 4-97316), in the case where the lamp main body has an ellipse shape, distribution of refractive indexes of the lamp main body section is uniform. Moreover, since distribution of an outgoing light is caused due to a shape of the lamp main body, only the refractive indexes of the lamp main body and refractive indexes of air can be utilized. Therefore, in order to accomplish complicated distribution of refractive indexes, a glass member should be processed complicatedly.

In addition, with the arrangement disclosed in Japanese Unexamined Patent Publication No. 2-63092/1990 (Tokukaihei 2-63092), in order to utilize a light which has been reflected by the reflecting member 53, at any rate, it is necessary to emit a light from the lamp main body 52a into the air. Moreover, a reflected light repeats multiple reflection between the lamp main body 52a and the fluorescent material 55 provided on the inner periphery of the lamp main body 52a so as to be attenuated.

In other words, in order to make a light to be emitted from a discharge lamp enter a light guiding plate efficiently so that efficiency of utilization of a light of a discharge lamp for a light guiding plate is improved, it is necessary to control distribution of intensity in a light outgoing direction on the surface of the discharge lamp so that the light can be emitted from the surface of the discharge lamp to a specified direction.

SUMMARY OF THE INVENTION

It is a first object of the present invention to provide a discharge lamp which is capable of converging a light to a specific direction.

In order to attain the first object, a discharge lamp of the present invention is characterized by comprising:

a cylindrical lamp main body where a fluorescent material is coated on its inner circumferential surface, wherein the lamp main body has an arrangement that refractive indexes are distributed so that a light, which is emitted from the inner circumferential surface of the lamp main body and enter the lamp main body so as to travel to an outer circumferential surface, is guided to a specified direction.

With the above arrangement, the distribution of refractive indexes in which a light can be guided to a specified direction is, for example, distribution where a value of refractive indexes changes gradually or continuously so that a light is converged to one direction by utilizing refraction of the light, or distribution where a large boundary of refractive indexes is created so that a light is converged to one direction by utilizing reflection of the light. Therefore, a light, which travels from an inner circumferential surface of the lamp main body of the discharge lamp through the lamp main body to an outer circumferential surface, is emitted from the outer circumferential surface of the lamp main body to a specified direction by such distribution of refractive indexes in the lamp main body. As a result, the discharge lamp which is capable of emitting a light from the surface of the lamp main body to a specified direction can be obtained by controlling distribution of intensity in the light emitting direction on the surface of the discharge lamp without using a reflecting member in a conventional way.

It is a second object of the present invention to provide a lighting apparatus with excellent surface brightness and low power consumption using the above kind of a discharge lamp.

In order to attain the second object, a lighting apparatus of the present invention is characterized by comprising:

a light guiding material having light transmitting characteristics; and a discharge lamp provided on at least one end of the light guiding material having a cylindrical lamp main body where a fluorescent material is applied to its inner circumferential surface, the lamp main body having an arrangement that refractive indexes are distributed such that a light traveling from the inner circumferential surface to an outer circumferential surface of the lamp main body is guided towards the one end.

With the above arrangement, in the lighting apparatus, the discharge lamp for attaining the first object is provided on at least one end of the light guiding material with light transmitting characteristics. The discharge lamp can emit a light from the surface of the lamp main body to a specified direction. Therefore, the provision of such a discharge lamp makes it possible to make a light emitted from the discharge lamp efficiently enter the one end of the light guiding material without improving efficiency of incidence into the light guiding material by sticking a reflecting material on a periphery of the lamp main body or by providing a reflecting member with it kept a constant distance from the lamp main body. This makes it possible to make the light emitted from the discharge lamp efficiently enter the light guiding material so as to improve efficiency of utilization of a light of the discharge lamp for the light guiding material. As a result, a lighting apparatus with high surface brightness and low power consumption can be obtained.

For a fuller understanding of the nature and advantages of the invention, reference should be made to the ensuing detailed description taken in conjunction with the accompanying drawings.

DESCRIPTION OF THE EMBODIMENTS

[EMBODIMENT 1]

The following will discuss one embodiment of the present invention referring to FIGS. 1 through 6.

Figure 2A:
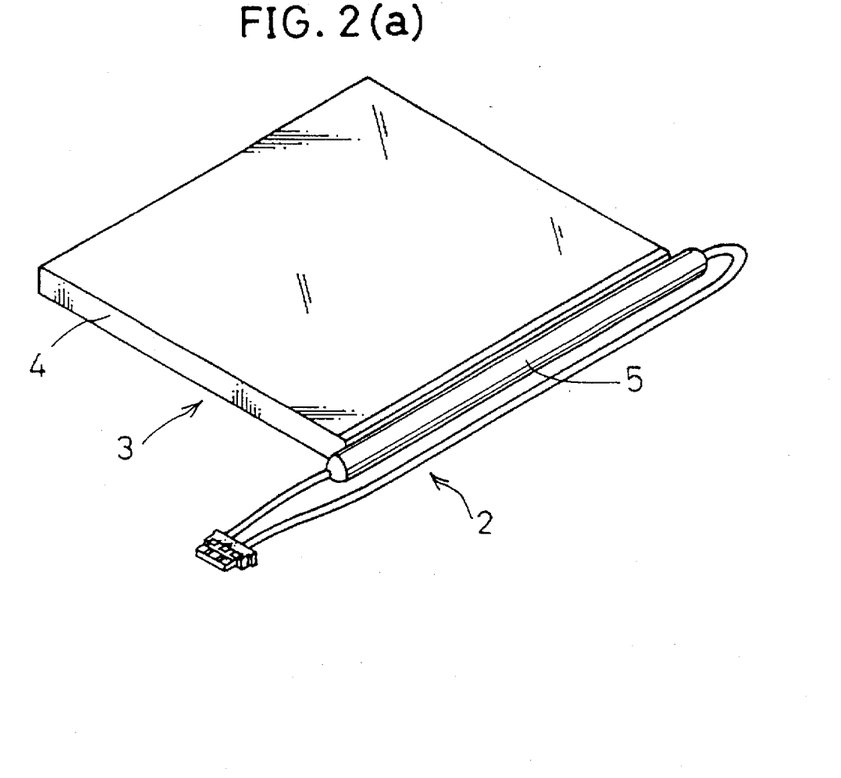
FIG. 2(a) is a perspective view which shows a lighting apparatus of an edge-lighting type using the above discharge lamp.

As shown in FIG. 2(a), a lighting apparatus of the present embodiment is a plane lighting apparatus adopting an edge-lighting method. This lighting apparatus is provided on a rear side of a liquid crystal panel (not shown) in a liquid crystal display apparatus, for example, as a back-lighting section for irradiating on the liquid crystal panel.

The lighting apparatus is composed of a light source section 2 having a discharge lamp 5 which is a discharge lamp, and a light guiding section 3 having a light guiding plate (light guiding material) 4 where an emitted light from the light source 2 enters so as to form a surface light source.

Figure 2B:
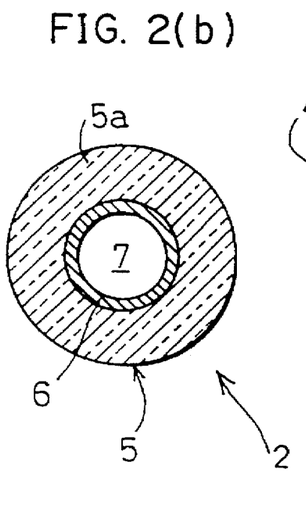
FIG. 2(b) and 2(c) are cross section of a main section which shows the lighting apparatus of an edge-lighting type using the discharge lamp.
Figure 2C:
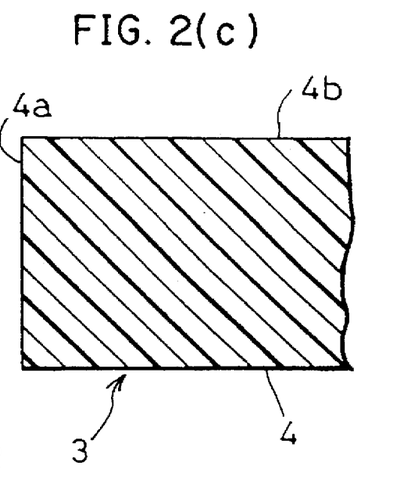

As shown in FIG. 2(b) and 2(c), the light guiding plate 4 in the light guiding section 3 is a transparent resin plate with light transmitting characteristics composed of acrylic resin, etc., for example. The light guiding plate 4 scatters a light which has entered from a light incident surface 4a which is an end surface facing the light source 2 side at a reflecting section (not shown) provided below the light guiding plate 4. The scattered light goes out from a light outgoing surface 4b which is an upper surface in the drawing so as to be irradiated on a liquid crystal panel positioned on an upper part.

The discharge lamp 5 positioned in the light source section 2 has a cylindrical lamp main body 5a composed of soda glass containing alkaline ion. The inner periphery of the lamp main body 5a is uniformly coated with fluorescent material 6, and hydrargyrum and a small amount of argon, etc. are sealed in an inner space 7 of the lamp main body 5a with them having lower pressure than air pressure. An ultraviolet ray generated in the inner space 7 is converted to a visible light by the fluorescent material 6 and is scattered so as to be emitted from the surface of the discharge lamp 5 through the lamp main body 5a.

The lamp main body 5a of the discharge lamp 5 has distribution of a refractive index as mentioned later. The light, which is emitted from the surface of the discharge lamp 5 through the lamp main body 5a by an action of distribution of the refractive indexes in the lamp main body 5a, is controlled as to its direction of travel so as to be converged in one direction. As a result, the light is emitted from one direction. Therefore, the discharge lamp 5 is positioned in a desired position in circumferential direction of a cross sectional circle of the discharge lamp 5 so that the light guiding plate 4 as a surface light source emits a light high-efficiently. In other words, after the light, which is emitted from the surface of the discharge lamp 5 through the lamp main body 5a into air, is refracted on a boundary surface of the lamp main body 5a and an air layer, the light reaches the light incident surface 4a of the light guiding plate 4 provided in the light guiding section 3 and is combined so that the light guiding plate 4 emits a light high-efficiently as the surface light source.

As to the distribution of refractive indexes in the lamp main body 5a which is capable of controlling a direction of travel of a light, there exists two cases: the case where a light is converged in one direction utilizing refraction of the light; and the case where a light is converted in one direction utilizing reflection due to a large refractive index boundary. In the discharge lamp 5 of the present embodiment, a refractive index is distributed utilizing the refraction of a light.

Figure 1:
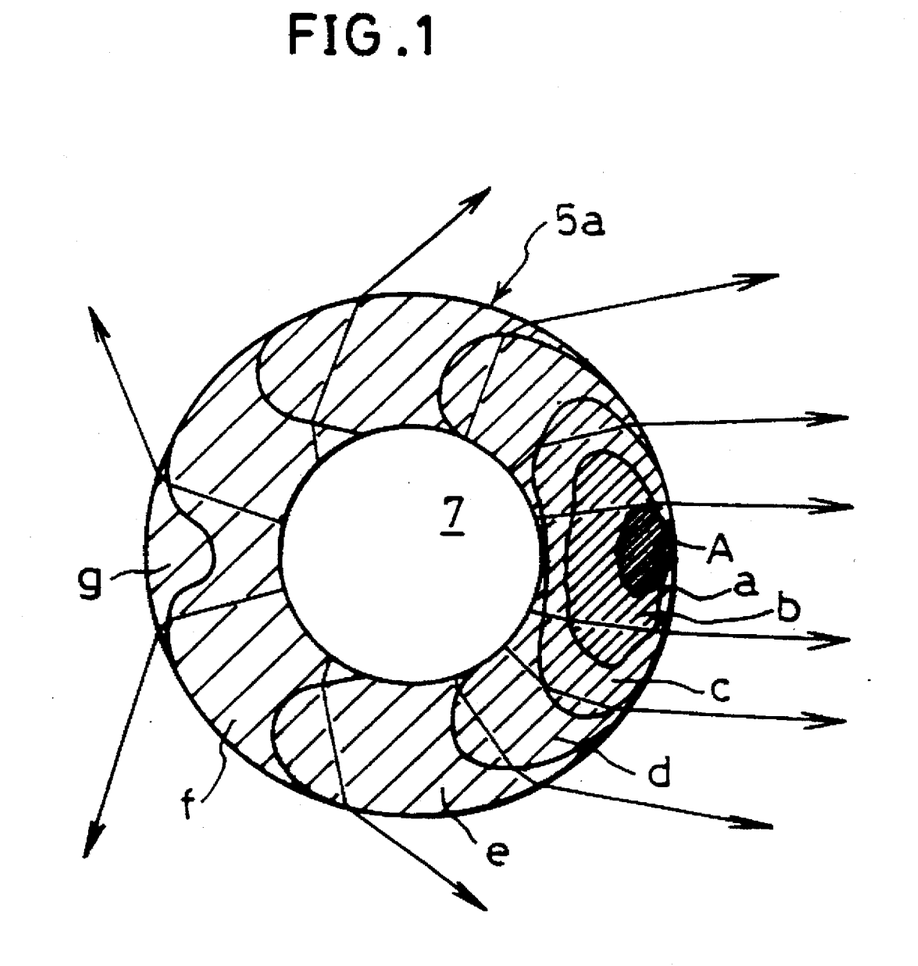
FIG. 1 shows one embodiment of the present invention and is an explanatory drawing which shows distribution of refractive indexes of a lamp main body in a discharge lamp and a direction in which a light passes depending on the distribution of the refractive indexes.

In other words, as shown in FIG. 1, In the cross sectional circle which lies at right angles to a cylinder axis of the lamp main body 5a, the lamp main body 5a is divided into portions a through g having seven different refractive indexes by dividing lines. At this time, starting from a temporary point A for designing provided around an outer periphery on a side where a light is desired to be converged, the refractive index gradually changes towards a back surface side which is opposite to the converging side. As to the refractive indexes of the portions a through g, the refractive index is higher on the portion f than on the portion g and higher on the portion e than on the portion f, namely, the refractive indexes are falsely set such that they gradually become higher in the order of the portions g-f-e-d-c-b-a. With such distribution of refractive indexes, as indicated by arrows in FIG. 1 the light generated in the inner space 7 of the lamp main body 5a travels with it refracted towards a high refractive index side, namely, the light is emitted with it converged in right direction of the starting point A in the drawing.

Figure 3:
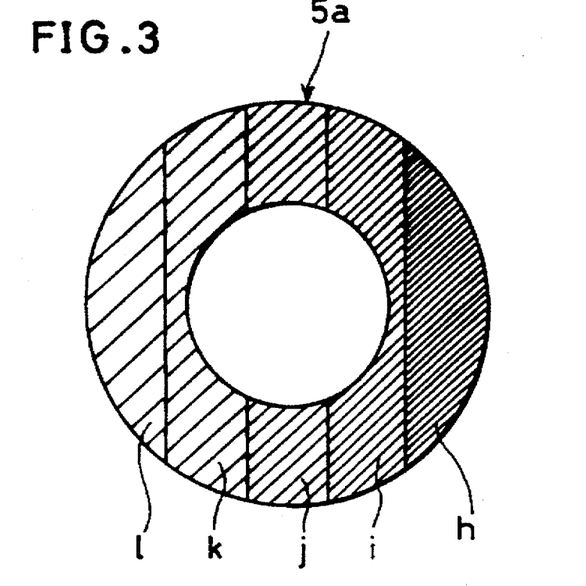
FIG. 3 is an explanatory drawing which shows another distribution of refractive indexes of the lamp main body in the discharge lamp.

Here, the distribution of refractive indexes utilizing refraction is not limited to the distribution state in FIG. 1. As shown in FIG. 3, for example, in the distribution of refractive indexes, the lamp main body 5a may be divided into portions h through 1 having five different refractive indexes. At this time, the refractive indexes gradually change towards direction of a diameter of the lamp main body 5a, namely, parallel to a surface on which an outgoing light from the lamp main body 5a is irradiated. In this case, as to the refractive indexes on the portions h through 1, the refractive index is higher on the portion k than on the portion 1 and higher on the portion j than on portion k, namely, the refractive indexes falsely are set such that they gradually become higher in the order of the portion 1-k-j-i-h. As a result, the light generated in the inner space 7 of the lamp main body 5a travels with it refracted towards a high refractive index side, and in a similar manner to the distribution of refractive indexes shown in FIG. 1, the light is emitted with it converged in right direction in the drawing.

Here, such distribution of refractive indexes is only one example, dividing lines of each portion may be a curved line or a straight line. Moreover, a number of division by a dividing line is not limited to this. Further, instead of gradually changing the refractive index in the above manner, the refractive index may be set so as to be continuously changed.

As to a method of arranging the lamp main body 5a so that refractive indexes are distributed in such a manner, an ion exchange method for a material of the lamp main body 5a is used. This is carried out before or after hydrargyrum, argon, etc. are sealed into the inner space 7 of the lamp main body 5a. This makes it possible to form portions inside the lamp main body 5a having different refractive indexes.

Figure 4:
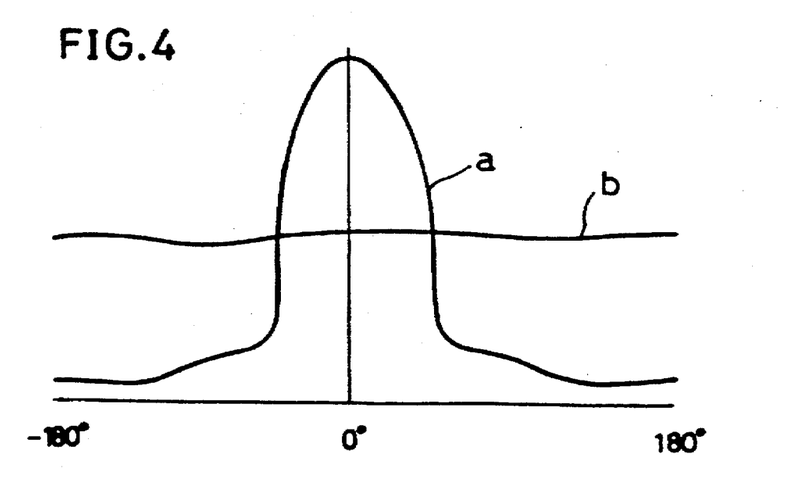
FIG. 4 shows directivity of the discharge lamp compared with conventional one and is a graph which shows a relationship between a light outgoing angle in a cross-sectional circle of the discharge lamp and surface brightness of the discharge lamp.

When the lamp main body 5a in the discharge lamp 5 is arranged so that the refractive indexes are distributed, a relationship between an angle of light outgoing on the cross sectional circle of the discharge lamp and surface brightness of the discharge lamp 5 is shown in a graph a of FIG. 4. In the drawing, a horizontal axis represents the angle of light outgoing on the cross sectional circle of the discharge lamp, and a vertical axis represents the brightness. Moreover, a graph b shows the relationship as comparison in the case where a conventional discharge lamp where a lamp main body is arranged so that refractive indexes are uniformly distributed.

As is clear from the drawing, in the case of the conventional discharge lamp, uniform brightness is obtained at the angle of whole light outgoing (−180° to 180°), namely, the outgoing light is substantially uniformly distributed. On the contrary, in the case of the discharge lamp 5, brightness only on a part of the range of an angle of light outgoing remarkably becomes high, but brightness in a range other than the above remarkably become low. It is found that the outgoing light is converged in one direction.

In such a manner, in the lighting apparatus of the present embodiment, the discharge lamp 5 where refractive indexes are distributed so that a light can be converged in one direction to the lamp main body 5a is used and it is suitably positioned. As a result, in a conventional way, a light emitted from the discharge lamp 5 can be efficiently made enter the reflecting member and can be guided into the light guiding plate 4a without heightening efficiency of incidence by providing reflecting member with it stuck to a circumference of the lamp main body or kept a fixed distance from the lamp main body. This makes it possible to obtain a lighting apparatus with high brightness and low power consumption. Moreover, since a number of members in the lighting apparatus is decreased, a number of assembly steps is decreased so that efficiency of operation can be improved.

In addition, when the lighting apparatus with high efficiency of utilization of a light, high brightness and low power consumption is used as a back-lighting section of a liquid crystal display apparatus, an excellent liquid crystal display apparatus with low power consumption and high brightness can be obtained.

Here, the lamp main body 5a of the discharge lamp 5 of the present embodiment has an arrangement that refractive indexes are distributed so that a direction of travel of a light can be controlled by utilizing refraction of a light, but the discharge lamp of the present invention is not limited to this. In other words, as mentioned above, it is also possible to give refractive index distribution having a large index boundary in which a direction of travel of a light is controlled by utilizing reflection on the boundary surface so that the light is converged in one direction.

Figure 5:
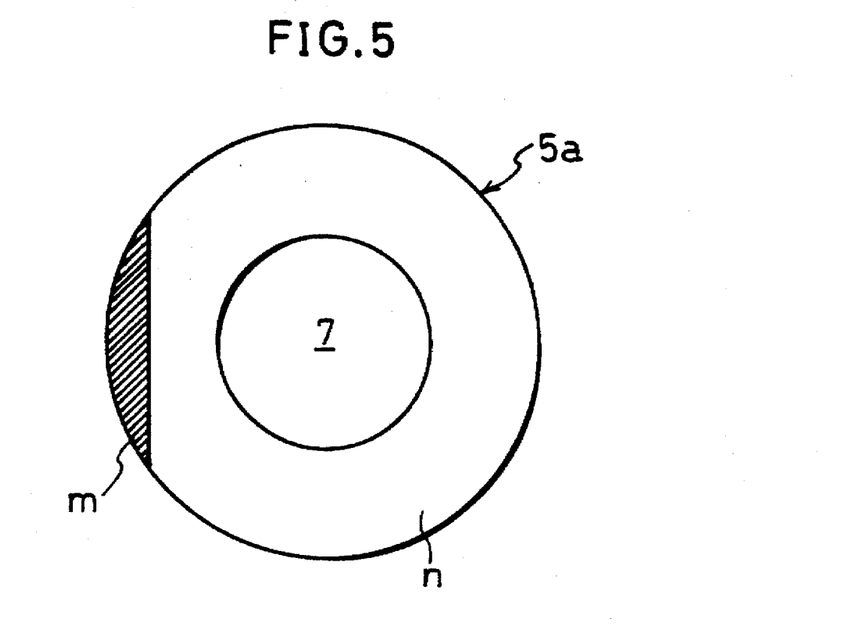
FIG. 5 is an explanatory drawing which shows another distribution of refractive indexes of the lamp main body in the discharge lamp.

An example of such distribution of refractive indexes utilizing reflection is shown in FIG. 5. The lamp main body 5a is divided into two portions: a portion n having the smallest refractive index which constitutes a large portion; and a portion m having an extremely high refractive index with respect to the refractive index on the portion n which is provided on an outer periphery side of the lamp main body 5a. When refractive indexes are distributed in such a manner, a light, which is generated in the inner space 7 of the lamp main body 5a and travels in the portion n towards the portion m, is reflected on a boundary surface of the portions n and m so as to be emitted towards the right in the drawing.

Here, the distribution of refractive indexes in this case is also one example, so a boundary line on each portion may be a curved line or a straight line.

Figure 6:
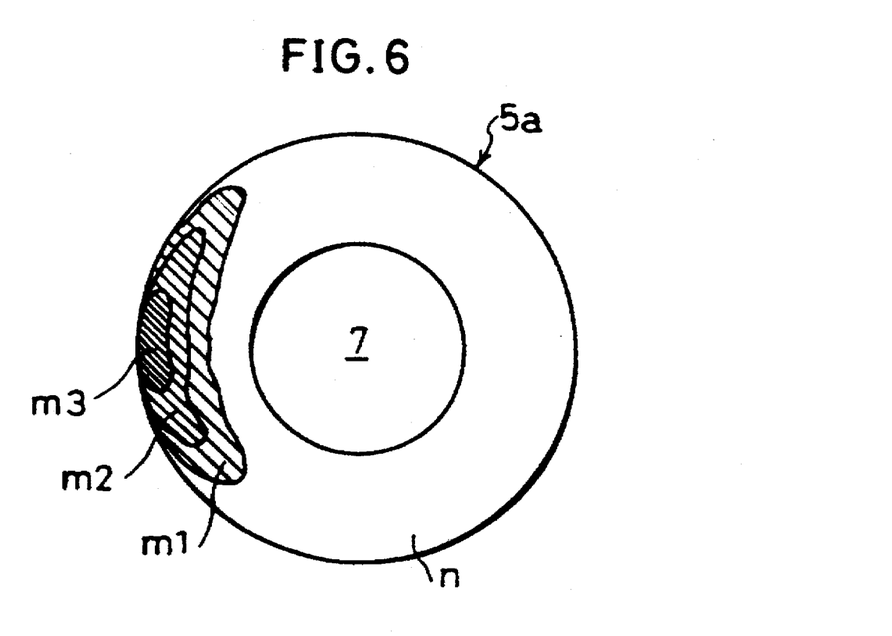
FIG. 6 is an explanatory drawing which shows another distribution of refractive indexes of the lamp main body in the discharge lamp.

Moreover, as shown in FIG. 6, the portion m may be further divided into three portions m1, m2 and m3, for example, in which refractive index becomes gradually higher towards a back surface of the lamp main body 5a.

In addition, a lamp main body of a discharge lamp may have an arrangement that refractive indexes are distributed so that a light can be converged in one direction utilizing refraction of the light and also a light can be converged in one direction utilizing reflection on an index boundary.

[EMBODIMENT 2]

Figure 7:
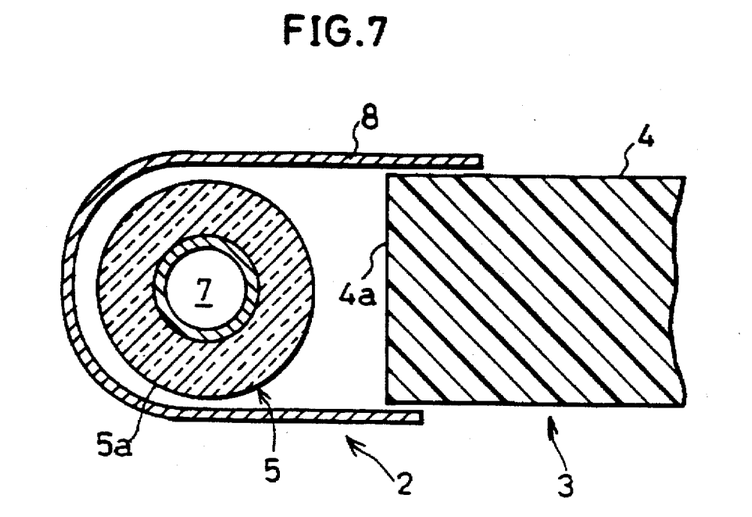
FIG. 7 showing another embodiment of the present invention is a cross section of a main section of a lighting apparatus of an edge-lighting type in which a reflecting member for reflecting a light from a discharge lamp is provided.
Figure 8:
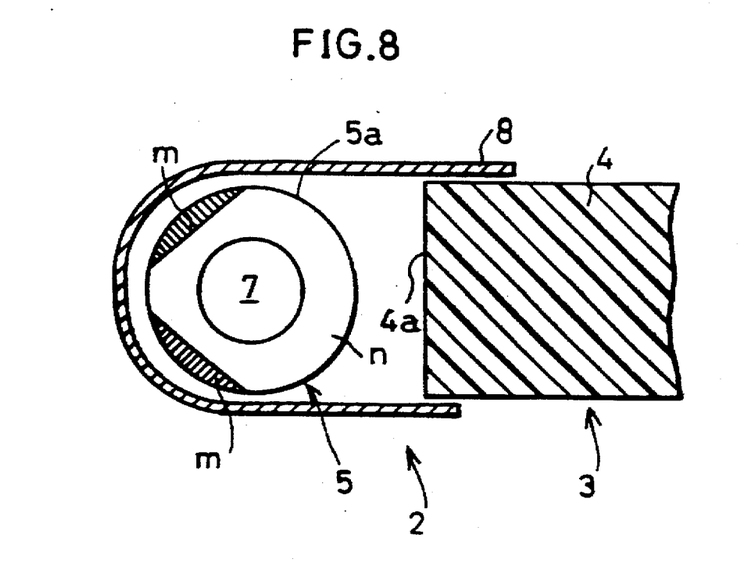
FIG. 8 is an explanatory drawing which shows distribution of refractive indexes of a lamp main body in the discharge lamp provided in the lighting apparatus shown in FIG. 7.
Figure 9:
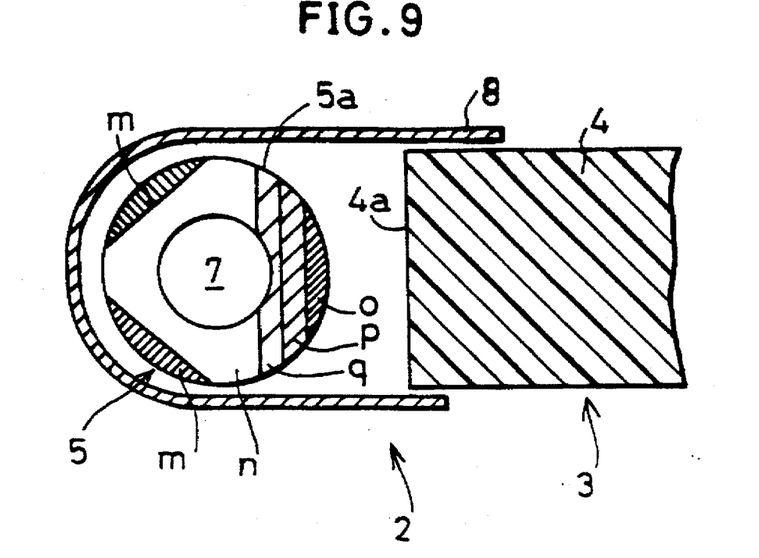
FIG. 9 is an explanatory drawing which shows another distribution of refractive indexes of the lamp main body in the discharge lamp provided in the lighting apparatus shown in FIG. 7.

Next, the following will discuss another embodiment of the present invention referring to FIGS. 7 through 9. Here, for convenience of explanation, those members that have the same arrangement and functions, and that are described in the aforementioned embodiments are indicated by the same reference numerals and the description thereof is omitted.

As shown in FIG. 7, a lighting apparatus of the present embodiment is arranged such that a reflecting member 8 is provided to the lighting apparatus of embodiment 1. The reflecting member 8 is positioned on a back surface side of a discharge lamp 5 and reflects an outgoing light from the discharge lamp 5.

The provision of the reflecting member 8 can realize optical designing other than that a light is converged in one direction, which is shown in FIGS. 1, 3, 5 and 6 of embodiment 1. In other words, as shown in FIG. 8, for example, when in consideration of reflection and scattering by the reflecting member 8, two portions m where the refractive index is extremely high are provided on a portion n (has the lowest refractive index), two converging directions by reflection can be provided so that a light is converged on a light incident surface 4a of a light guiding plate 4. As a result, a number of members increases, but freely optical designing is possible, thereby making production of a unit easy.

In addition, since the reflecting member 8 does not need to be installed so as to be stuck to a circumference of a lamp main body or to be kept a fixed distance from the lamp main body in like a conventional manner, and is auxiliary provided, assembly is easy, thereby making it possible to improve efficiency of operation.

In addition, when the reflecting member 8 is provided, a light which cannot be guided only by the distribution of refractive indexes in the lamp main body 5a in the light emitted from the discharge lamp 5 can also be converged on the light guiding plate 4 side, thereby making it possible to further raise efficiency of utilization of a light.

As a result, a lighting apparatus with higher surface brightness and lower power consumption can be obtained, thereby making it possible to obtain an excellent liquid crystal display apparatus with lower power consumption and higher brightness.

Here, the distribution of refractive indexes in the lamp main body 5a in the discharge lamp 5 of the present embodiment is not limited to that shown in FIG. 8, so it may be that shown in FIG. 9, for example. This is arranged such that portions o through q in which refractive indexes becomes lower gradually in the order of o-p-q from a converging side of the lamp main body 5a is further added to the arrangement of the distribution of refractive indexes in FIG. 8. In other words, the distribution of refractive indexes is designed by combining converging action due to reflection with converging action due to refraction. Therefore, when a lighting apparatus provided with the reflecting member 8 is installed, the converging action due to reflection as well as the converging action due to refraction of a light are produced on a surface where the lighting apparatus faces the light guiding plate 4 side.

[EMBODIMENT 3]

Figure 10:
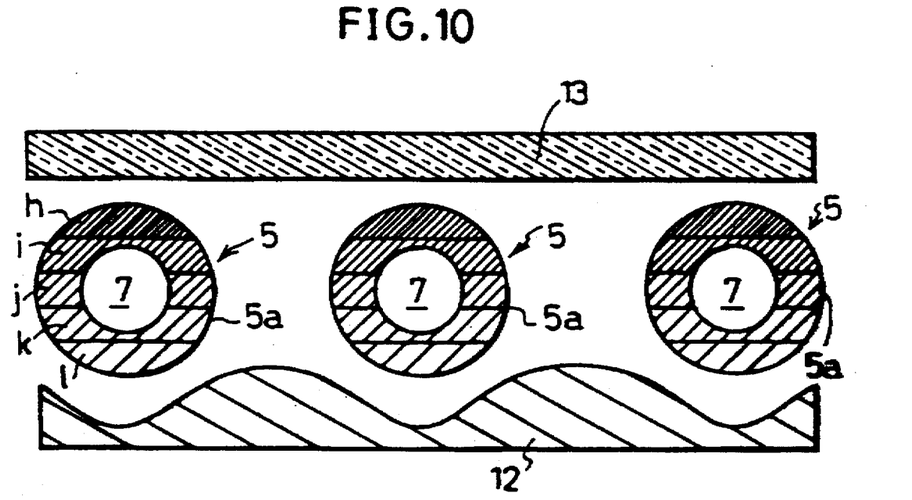
FIG. 10 showing another embodiment of the present invention is a cross section of a lighting apparatus of a direct-under-type and shows distribution of refractive indexes of a lamp main body in a discharge lamp provided in this lighting apparatus.
Figure 11:
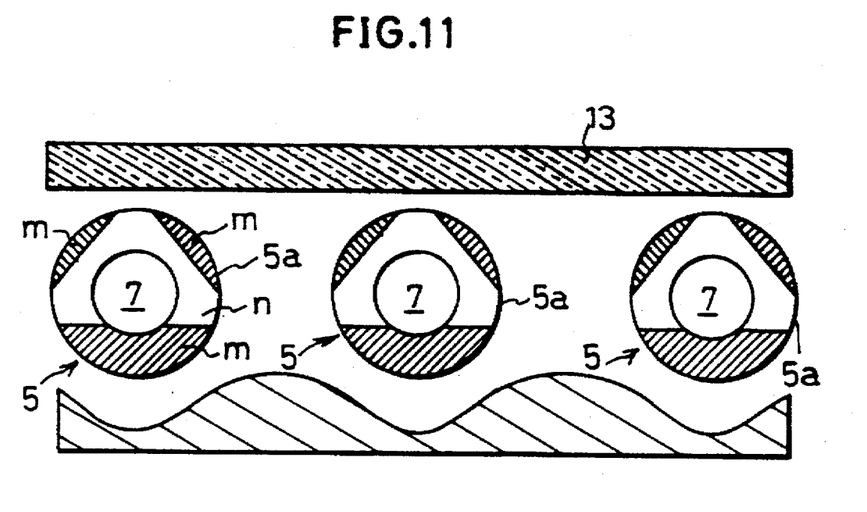
FIG. 11 is an explanatory drawing which shows another distribution of refractive indexes of the lamp main body in the discharge lamp provided in the lighting apparatus shown in FIG. 10.

Next, the following will discuss another embodiment of the present invention referring to FIGS. 10 and 11. Here, for convenience of explanation, those members that have the same arrangement and functions, and that are described in the aforementioned embodiments are indicated by the same reference numerals and the description thereof is omitted.

As shown in FIG. 10, a lighting apparatus of the present embodiment is a flat lighting apparatus adopting a direct-under-type system. The lighting apparatus is provided on a back surface side of a liquid crystal panel (not shown) in a liquid crystal display apparatus, for example, as a back-lighting section for irradiating the liquid crystal panel.

A plurality of cathode ray tubes 5 ... which are discharge lamps are installed parallel in the lighting apparatus. A reflecting plate 12 is provided on a lower surface of the lighting apparatus (opposite side to the liquid crystal panel), and a light intensity equalizing sheet 13 for equalizing intensity of a light to be supplied to the liquid crystal panel is provided on its upper surface (liquid crystal panel side).

Refractive indexes of the lamp main body 5a in each discharge lamp 5 are distributed in the same way as that shown in FIG. 3 of embodiment 1. In other words, as to the distribution of refractive indexes, a refractive index is higher on the portion k than on the portion 1 and higher on the portion J than on the portion k, namely, the refractive indexes on the portions 1 through h are set such that they become gradually higher in the order of 1-k-J-i-h. As a result, when a light emitted from a inner space 7 travels while being refracted to high refractive index side and is emitted from an upper side in the drawing, intensity of the light is equalized by the light intensity equalizing sheet 13 and the light is irradiated on the liquid crystal panel.

In addition, a light, which cannot be guided only by distribution of refractive indexes in the lamp main body 5a in the light emitted from the discharge lamp 5, is reflected by the reflecting member 12 so as to be irradiated on the liquid crystal panel through the light intensity equalizing sheet 13.

In such a way, in the lighting apparatus of the present embodiment, the discharge lamp 5 provided with the lamp main body 5a, in which refractive indexes are distributed so that a light can be converged in one direction, is used so as to be installed suitably to a converging direction, thereby making it possible to further ensure an uniform amount of a light to be irradiated on the light intensity equalizing sheet 13 further than before. Therefore, the light intensity equalizing sheet 13 whose light transmitting characteristics are more excellent than that of a light intensity equalizing sheet provided in a conventional direct-under-type lighting apparatus can be utilized. For this reason, a loss of a light, which occurs when a light is transmitted through the light intensity equalizing sheet 13, is controlled, so efficiency of utilization of a light becomes high, thereby making it possible to utilize the light emitted from the discharge lamp 5 as an irradiating light on the liquid crystal panel at high efficiency. As a result, a lighting apparatus with high surface brightness and low power consumption can be obtained.

In addition, when a lighting apparatus with high efficiency of utilization of a light, high brightness and low power consumption is used as a back-lighting section of a liquid crystal display apparatus, an excellent liquid crystal display apparatus with low power consumption and high brightness can be obtained.

Here, the distribution of refractive indexes in the lamp main body 5a in each discharge lamp 5 is not also limited to that utilizing the method shown in FIG. 10. For example, as shown in FIG. 11, the distribution of refractive indexes may be arranged such that three portions m having extremely high refractive index are provided on a portion n (having lowest refractive index) and reflection of a light is utilized.

[EMBODIMENT 4]

Figure 12:
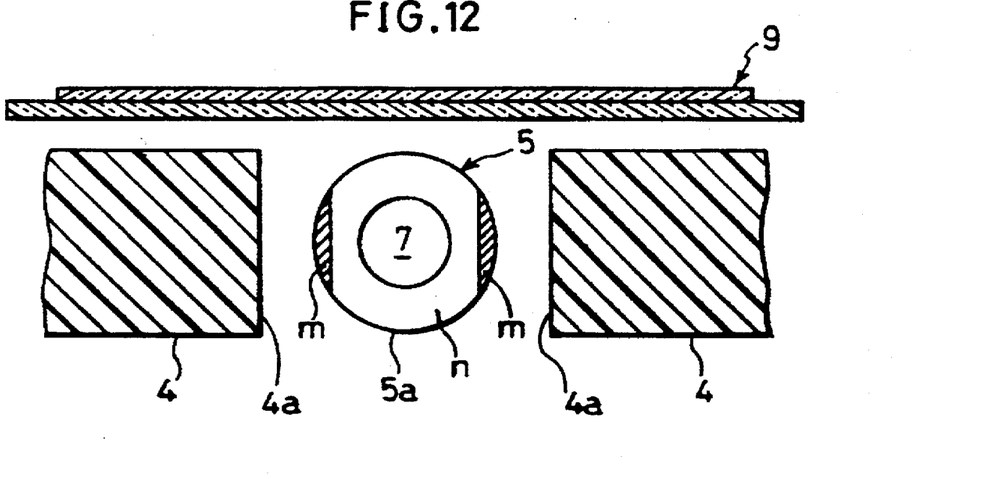
FIG. 12 shows another embodiment of the present invention and is a cross section of a liquid crystal display apparatus in which a lighting apparatus provided with two light guiding plates is positioned under a liquid crystal panel.

Next, the following will discuss another embodiment of the present invention referring to FIG. 12. Here, for convenience of explanation, those members that have the same arrangement and functions, and that are described in the aforementioned embodiments are indicated by the same reference numerals and the description thereof is omitted.

As shown in FIG. 12, a lighting apparatus of the present embodiment is a flat lighting apparatus adopting edge-lighting method in which two light guiding plates 4,4 are used. In the present embodiment, the lighting apparatus is provided on a back surface of a liquid crystal panel 9 in a liquid crystal display apparatus as a back-lighting section for irradiating the liquid crystal panel 9. A discharge lamp 5 is positioned between the light guiding plates 4,4.

In the discharge lamp 5 installed in such a lighting apparatus, two portions m having extremely high refractive index compared with a portion n (having lowest refractive index) are provided so that a light can be converged in a direction of light incident surface 4a. 4a of the light guiding plates 4,4. In this case, a light intensity equalizing sheet which is usually required on a light emitting surface can be removed by controlling distribution of refractive indexes in the lamp main body 5a. As a result, the liquid crystal panel 9 can be directly positioned in light emitting direction of the discharge lamp 5. For this reason, since a number of members in the lighting apparatus is decreased, steps of assembly is decreased, thereby making it possible to improve efficiency of operation. Moreover, since a loss of a light at the time when a light is transmitted through a light intensity equalizing sheet does not occur, efficiency of utilization of a light can be further raised.

This makes it possible to obtain a lighting apparatus with higher surface brightness and lower power consumption. As a result, an excellent liquid crystal display apparatus with lower power consumption and higher brightness can be obtained.

[EMBODIMENT 5]

Figure 13:
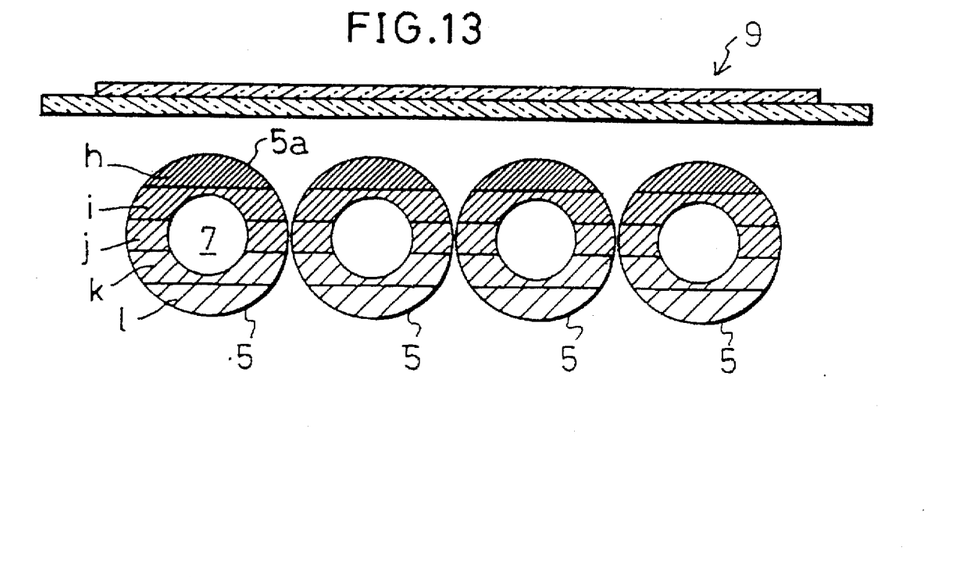
FIG. 13 shows another embodiment of the present invention and is a cross section of a liquid crystal display apparatus in which cathode ray tubes arranged as a lighting apparatus is positioned under a liquid crystal panel.

Next, the following will discuss another embodiment of the present invention referring to FIG. 13. Here, for convenience of explanation, those members that have the same arrangement and functions, and that are described in the aforementioned embodiments are indicated by the same reference numerals and the description thereof is omitted.

As shown in FIG. 13, a lighting apparatus of the present embodiment is a flat lighting apparatus where a plurality of cathode ray tubes 5 . . . are installed parallel in close proximity and the cathode ray tubes are used as a surface light source. In the present embodiment, the lighting apparatus is provided on a back surface side of a liquid crystal panel 9 in a liquid crystal display apparatus as a back-lighting section for irradiating the liquid crystal panel 9.

Refractive indexes of a lamp main body 5a in each discharge lamp 5 are distributed in the same way as that shown in FIG. 3 of embodiment 1. In other words, the refractive index is higher on the portion k than on the portion 1 and higher on the portion J than on the portion k, namely, the refractive indexes are set such that they become higher gradually in the order of the portions 1-k-j-i-h. As a result, a light emitted from an inner space 7 travels while being refracted to a high refractive index side, and is emitted from an upper side in the drawing so as to be irradiated on the liquid crystal panel 9.

In this case, when each discharge lamp 5 is positioned in close proximity and distribution of refractive indexes in the lamp main body 5a is controlled, a light intensity equalizing sheet which is normally required on a light emitting surface can be removed. As a result, the liquid crystal panel 9 can be directly positioned in a light emitting direction of the cathode ray tubes 5 . . . .

With this arrangement, an effect which is similar to that described in the aforementioned embodiment 4 can be gained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A discharge lamp, comprising:
   a cylindrical lamp main body where a fluorescent material is coated on an inner circumferential surface of said lamp main body;

wherein an inner area of said lamp main body between the inner circumferential surface and an outer circumferential surface of said lamp main body has uneven refractive indexes so that light, which is emitted from the inner circumferential surface of the lamp main body and enters said inner areas so as to travel to the outer circumferential surface, is guided to a specified predetermined direction.

2. The discharge lamp as defined in claim 1, wherein said lamp main body is composed of a family of soda glass containing alkaline ion.

3. The discharge lamp as defined in claim 1, wherein said lamp main body is gradually divided into a plurality of portions by boundary lines on a lamp main body cross-sectional circle, said plurality of portions being formed such that the refractive indexes become gradually lower from a light converging side where light is converged towards a back surface which is opposite to the converging side.

4. The discharge lamp as defined in claim 3, wherein the boundary lines are parallel to a surface on which the light emitted from said lamp main body is irradiated.

5. The discharge lamp as defined in claim 3, wherein the boundary lines are curved lines which spread from an arbitrary point around an outer periphery of the converging side to the back surface side.

6. The discharge lamp as defined in claim 3, wherein the plurality of boundary lines are on a cross sectional circle of the lamp body, said cross sectional circle lying at right angles to a cylinder axis of the lamp body.

7. The discharge lamp as defined in claim 1, wherein said lamp main body is arranged such that the refractive indexes continuously become lower from a converging side towards a back surface of the lamp main body.

8. The discharge lamp as defined in claim 1, wherein said lamp main body is divided by boundary lines on a cross-sectional circle which crosses at right angles to a cylinder axis of the lamp main body into a portion with a low refractive index which occupies a greater area of the lamp main body and a portion with an extremely high refractive index with respect to the low refractive index which is positioned on a back surface side of the portion with a low refractive index.

9. The discharge lamp as defined in claim 8, wherein the portion with a high refractive index is further divided into a plurality of portions gradually, said plurality of portions being formed such that refractive indexes become higher from a converging side towards a back surface of the lamp main body.

10. The discharge lamp as defined in claim 9, wherein the boundary lines are parallel to a surface where a light emitted from said lamp main body is converged.

11. The discharge lamp as defined in claim 9, wherein the boundary lines are curved lines which spread from an arbitrary point around an outer periphery of the back surface to the converging side.

12. The discharge lamp as defined in claim 1, wherein said lamp main body is divided into a first portion, a second portion and a third portion, the first portion being gradually divided by boundary lines on a cross-sectional circle which crosses at right angles to a cylindrical axis of said lamp main body such that refractive indexes become lower from a converging side towards a back surface of said main body, the second portion provided on a back surface side of the first portion having a lower refractive index, the third portion positioned on a back surface side of the second portion having an extremely high refractive index with respect to the refractive index of the second portion.

* * * * *